United States Patent
Buel et al.

(10) Patent No.: US 11,051,180 B2
(45) Date of Patent: Jun. 29, 2021

(54) ELECTRONIC DEVICE WITH CONFIGURABLE ANTENNA-PATTERN GROUP

(71) Applicant: ARRIS Enterprises LLC, Suwanee, GA (US)

(72) Inventors: William Buel, San Jose, CA (US); Huaqing Zeng, Fremont, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/185,008

(22) Filed: Nov. 9, 2018

(65) Prior Publication Data

US 2019/0150004 A1    May 16, 2019

Related U.S. Application Data

(60) Provisional application No. 62/586,887, filed on Nov. 15, 2017.

(51) Int. Cl.
  *H04W 16/28* (2009.01)
  *H04W 88/08* (2009.01)

(52) U.S. Cl.
  CPC ............ *H04W 16/28* (2013.01); *H04W 88/08* (2013.01)

(58) Field of Classification Search
  CPC ............ H01Q 3/00; H01Q 1/38; H01Q 25/00; H01Q 1/30; H01Q 9/16; H01Q 1/246; H04B 7/0413; H04B 7/0695; H04B 7/0608; H04W 16/28; H04W 88/08
  See application file for complete search history.

(56) References Cited

U.S. PATENT DOCUMENTS

| | | | |
|---|---|---|---|
| 2012/0169541 A1* | 7/2012 | Singh | G01S 1/042 342/417 |
| 2014/0146902 A1* | 5/2014 | Liu | H01Q 21/28 375/260 |
| 2014/0206380 A1* | 7/2014 | Do | H04W 16/20 455/456.1 |
| 2015/0172426 A1* | 6/2015 | Asrani | H04B 1/3888 455/77 |
| 2015/0249971 A1* | 9/2015 | Yu | H04W 72/04 370/330 |
| 2017/0117617 A1* | 4/2017 | Huang | H01Q 5/10 |

* cited by examiner

*Primary Examiner* — Ian N Moore
*Assistant Examiner* — Sun Jong Kim
(74) *Attorney, Agent, or Firm* — Steven Stupp; Stewart Wiener

(57) ABSTRACT

An electronic device receives installation information about an environment of the electronic device. For example, the installation information includes a type of installation of the electronic device, such as one of: installation on a wall, installation on a pole, installation in a stadium, or installation in street furniture. Based at least in part on the installation information, the electronic device selects a group of antenna patterns that includes a subset of potential antenna patterns. Then, the electronic device communicates, via an interface circuit in the electronic device, one or more packets or frames for another electronic device using an antenna pattern in the group of antenna patterns. Note that the electronic device determines the antenna pattern to use in subsequent communication. Moreover, the group of antenna patterns is selected based at least in part on an orientation, a location of the electronic device, or both.

19 Claims, 7 Drawing Sheets

ELECTRONIC DEVICE WITH CONFIGURABLE ANTENNA-PATTERN GROUP

BACKGROUND

Field

The described embodiments relate to techniques for communicating information among electronic devices. In particular, the described embodiments relate to techniques for configuring an antenna-pattern group for an electronic device.

Related Art

Many electronic devices are capable of wirelessly communicating with other electronic devices. In particular, these electronic devices can include a networking subsystem that implements a network interface for: a cellular network (UMTS, LTE, etc.), a WLAN (e.g., a wireless network such as described in the Institute of Electrical and Electronics Engineers (IEEE) 802.11 standard or Bluetooth from the Bluetooth Special Interest Group of Kirkland, Wash.), and/or another type of wireless network. For example, many electronic devices communicate with each other via WLANs using an IEEE 802.11-compatible communication protocol (which are sometimes collectively referred to as "Wi-Fi").

The wireless communication performance of an electronic device depends on a variety of factors, including the environment in which the electronic device is installed. In order to allow electronic devices to adapt to variation in these factors, some electronic devices have the ability to modify their transmit and/or receive antenna patterns. For example, an electronic device may include a set of N antenna elements that can be turned on or off (or, equivalently, coupled to ground), which can change a principal direction and beam width of the antenna pattern. Consequently, there may be $2^N$ available antenna patterns in a preconfigured or predefined group of antenna patterns in the electronic device.

Because of memory and cost constraints, the amount of memory in the electronic device may be constrained. Therefore, the number of available antenna patterns in the group of antenna patterns may also be restricted. For example, an electronic device intended for use in a particular installation environment may only include a subset of all the possible antenna patterns, such as one or more free-space antenna patterns.

However, small variations in the type of installation can have significant effects on the Wi-Fi coverage and the communication performance. If the available antenna patterns in the predefined group of antenna patterns are not optimized for the actual type of installation, the communication performance may be degraded. This sub-optimal communication performance may force customers to tradeoff the communication performance with the physical location of the electronic device.

SUMMARY

The described embodiments relate to an electronic device that selects a group of antenna patterns. This electronic device includes one or more antenna nodes that can couple to antenna elements. Moreover, the electronic device includes an interface circuit communicatively coupled to the one or more antenna nodes. During operation, the electronic device receives (such as at the interface circuit or via a user interface in the electronic device) installation information about an environment of the electronic device. Based at least in part on the installation information, the electronic device selects the group of antenna patterns that includes a subset of potential antenna patterns. Then, the electronic device communicates, via the interface circuit (such as transmitting and/or receiving), one or more packets or frames for another electronic device using an antenna pattern in the group of antenna patterns.

Moreover, the electronic device may determine the antenna pattern in the group of antenna patterns to use in the subsequent communication. By selecting the group of antenna patterns, the electronic device may reduce the size of the antenna-pattern space, which may simplify determination of the antenna pattern. For example, selecting the group of antenna patterns may facilitate a faster search for the antenna pattern.

Furthermore, the installation information may include a type of installation of the electronic device. For example, the type of installation may include one of: installation on a wall, installation on a pole, installation in a stadium, or installation in street furniture.

Additionally, the electronic device may receive environmental information, and the electronic device may select the group of antenna patterns based at least in part in the environmental information. For example, the environmental information may include an orientation of the electronic device and/or a location of the electronic device. In some embodiments, receiving the environmental information may involve determining the environmental information. In particular, the electronic device may determine a location in two dimensions (such as whether the electronic device is located at a corner in a room) and/or a height of the electronic device.

Note that the electronic device may include an access point.

In some embodiments, the group of antenna patterns is selected from an initial set of antenna patterns. After selecting the group of antenna patterns, the electronic device may receive, at the interface circuit, additional antenna patterns for inclusion in the group of antenna patterns, which are associated with another electronic device (such as a controller).

Moreover, the antenna elements may be included in an antenna module, which can be communicatively coupled, via a cable or wirelessly, to the one or more antenna nodes.

Another embodiment provides a computer-readable storage medium with a program module for use with the electronic device. When executed by the electronic device, this program module causes the electronic device to perform at least some of the aforementioned operations.

Another embodiment provides a method, which may be performed by the electronic device. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device that selects a group of antenna patterns is described. The electronic device may receive installation information about an environment of the electronic device. For example, the installation information may include a type of installation of the electronic device, such as one of: installation on a wall, installation on a pole, installation in a stadium, or installation in street furniture. Based at least in part on the installation information, the electronic device may select the group of antenna patterns that includes a subset of potential antenna patterns. Then, the electronic device communicates, via an interface circuit in the electronic device, one or more packets or frames for another electronic device using an antenna pattern in the group of antenna patterns. Note that the electronic device may determine the antenna pattern to use in subsequent communication. Moreover, the group of antenna patterns may be selected based at least in part on an orientation and/or a location of the electronic device.

By selecting the group of antenna patterns, this communication technique may allow the electronic device to adapt to different types of installation. Moreover, the group of antenna patterns may allow the antenna pattern to be more rapidly determined. Furthermore, because the group of antenna patterns includes the subset of the potential antenna patterns, the communication technique may allow the group of antenna patterns to be stored in the electronic device using less memory. Consequently, the communication technique may improve the communication performance of the electronic device, may accelerate and simplify optimization of the electronic device by reducing the size of the antenna space that needs to be searched to determine the antenna pattern, and/or may reduce the cost of the electronic device. Therefore, the communication technique may improve the user experience when communicating using the electronic device.

In the discussion that follows, the electronic device includes an access point communicates frames or packets in accordance with a wireless communication protocol, such as an Institute of Electrical and Electronics Engineers (IEEE) 802.11 standard (which is sometimes referred to as "Wi-Fi," from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols (such as Long Term Evolution or LTE, another cellular-telephone communication protocol, etc.) may be used.

Moreover, the access point may communicate with other access points and/or computers in a network using a wired communication protocol, such as an IEEE 802.3 standard (which is sometimes referred to as "Ethernet") and/or another type of wired interface. In the discussion that follows, Ethernet is used as an illustrative example.

Figure 1:
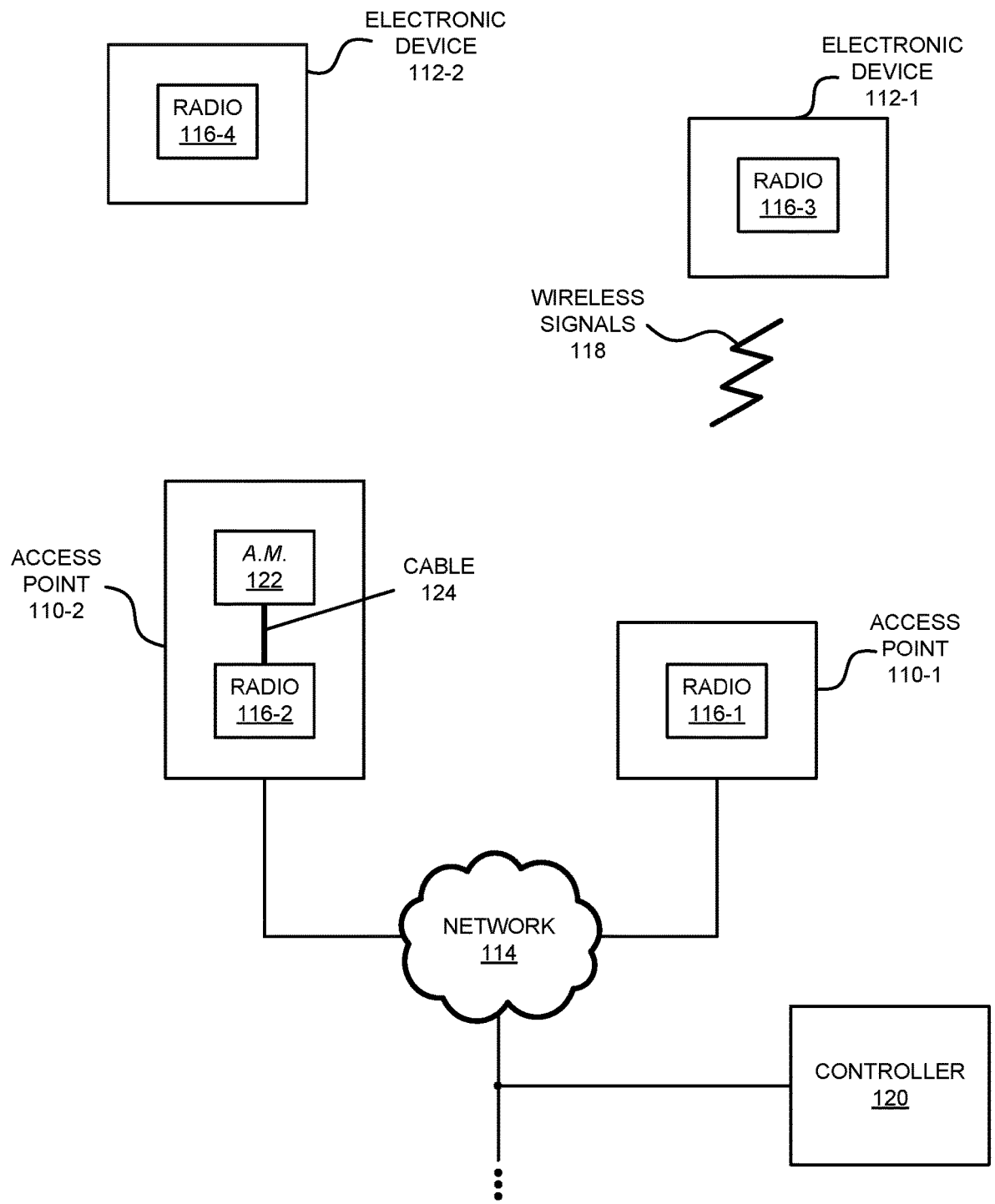
FIG. 1 is a block diagram illustrating communication among electronic devices in accordance with an embodiment of the present disclosure.

FIG. 1 presents a block diagram illustrating an example of communication among one or more access points 110 and one or more electronic devices 112 (such as a cellular telephone) in accordance with some embodiments. In particular, access points 110 may communicate with each other using wireless and/or wired communication. Note that access points 110 may include a physical access point and/or a virtual access point that is implemented in software in an environment of an electronic device or a computer. In addition, at least some of access points 110 may communicate with electronic devices 112 using wireless communication.

The wired communication among access points 110 may occur via network 114 (such as an intra-net, a mesh network, point-to-point connections, and/or the Internet) and may use a network communication protocol, such as Ethernet. Moreover, the wireless communication using Wi-Fi may involve: transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, wireless communication among access points 110 also involves the use of dedicated connections, such as via a peer-to-peer (P2P) communication technique.

Figure 7:
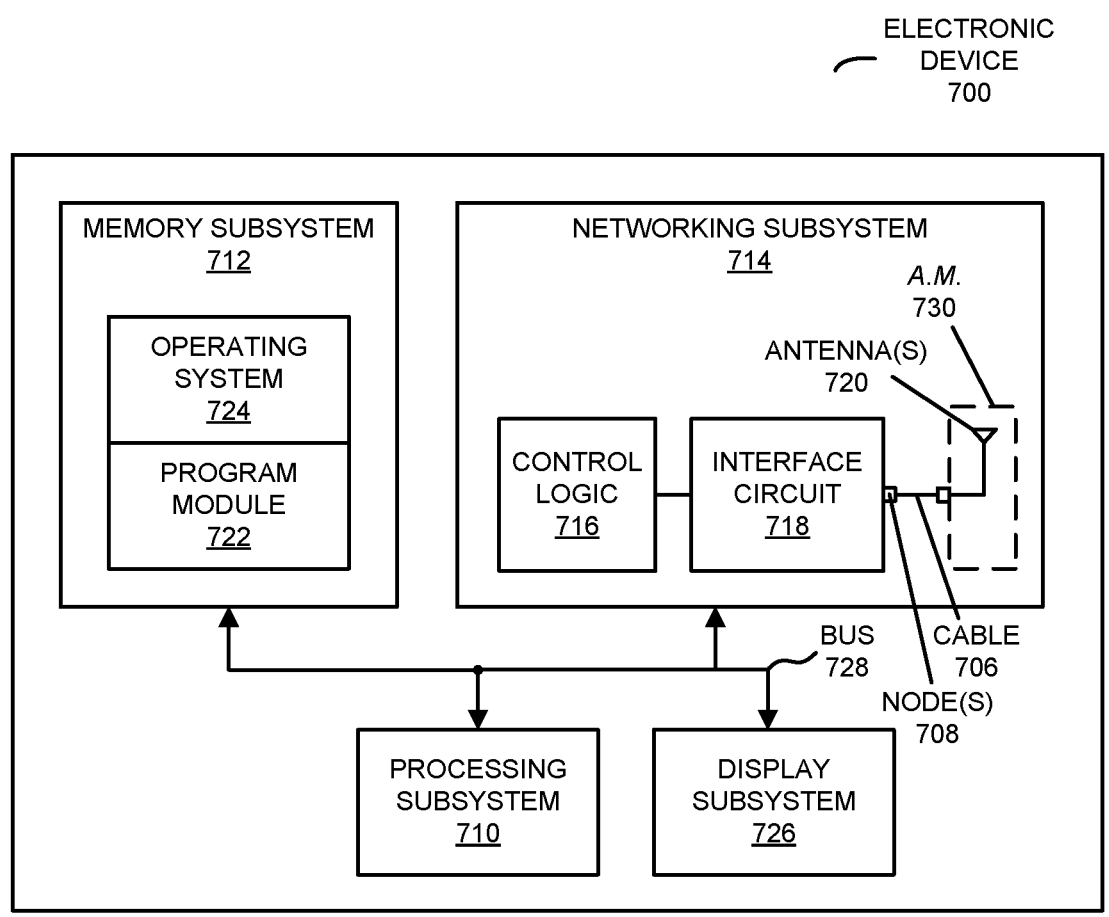
FIG. 7 is a block diagram illustrating an electronic device in accordance with an embodiment of the present disclosure.

As described further below with reference to FIG. 7, access points 110 and/or electronic devices 112 may include subsystems, such as a networking subsystem, a memory subsystem, and a processor subsystem. In addition, access points 110 and electronic devices 112 may include radios 116 in the networking subsystems (which may include at least some of the functionality in an access-point module). More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 116 are shown in access points 110 and electronic devices 112, one or more of these instances may be different from the other instances of radios 116.

As can be seen in FIG. 1, wireless signals 118 (represented by a jagged line) are transmitted from radio 116-1 in access point 110-1. These wireless signals may be received by radio 116-3 in electronic device 112-1. In particular, access point 110-1 may transmit frames or packets. In turn, these frames or packets may be received by electronic device 112-1. Moreover, access point 110-1 may allow electronic device 112-1 to communicate with other electronic devices, computers and/or servers via network 114.

Note that the communication among access points 110 and/or with electronic devices 112 may be characterized by a variety of performance metrics, such as: a received signal strength (RSSI), a data rate, a data rate for successful communication (which is sometimes referred to as a "throughput"), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 seconds) to an estimated maximum number of bytes that can be communicated in the time interval (the latter of which is sometimes referred to as the "capacity" of a communication channel or link), and/or a ratio of an actual data rate to an estimated data rate (which is sometimes referred to as "utilization").

In the described embodiments processing a packet or frame in access points 110 and electronic devices 112 includes: receiving wireless signals 118 with the packet or frame; decoding/extracting the packet or frame from received wireless signals 118 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, one of access points 110 (such as access point 110-1) may perform the communication technique. In particular, as described further below with reference to FIGS. 2 and 3, following installation in an environment (such as in a building, in a stadium, on a street, etc.), access point 110-1 may receive installation information about an environment of access point 110-1. For example, access point 110-1 may receive the installation information via radio 116-1. Alternatively or additionally, the installation information may be received using a user interface in access point 110-1. Note that the installation information may include a type of installation of access point 110-1. For example, as described further below with reference to FIG. 4, the type of installation may include one of: installation on a wall, installation on a pole, installation in a stadium, or installation in street furniture.

Moreover, access point 110-1 may receive or obtain environmental information. For example, the environmental information may include an orientation of the electronic device and/or a location of access point 110-1. In some embodiments, receiving the environmental information may involve determining the environmental information. In particular, access point 110-1 may determine: a location in two dimensions (such as whether access point 110-1 is located at a corner in a room), a height of access point 110-1 and/or a location in three dimensions. Note that the location may be determined using triangulation and/or trilateration. In some embodiments, the location is determined using a wireless network (such as a WLAN), a cellular-telephone network, a local positioning system and/or a global positioning system (e.g., access point 110-1 may include a global positioning system (GPS) module or receiver). Furthermore, the orientation of access point 110-1 may be determined using one or more of: an accelerometer, a gyroscope, and/or a magnetometer. In some embodiments, the environmental information is received via radio 116-1 and/or using the user interface in access point 110-1.

Based at least in part on the installation information and/or the environmental information, access point 110-1 may select a group of antenna patterns that includes a subset of potential antenna patterns.

Then, access point 110-1 may determine an antenna pattern (such as a transmit antenna pattern or a receive antenna pattern) in the group of antenna patterns to use in the subsequent communication. By selecting the group of antenna patterns, access point 110-1 may reduce a size of the antenna-pattern space, which may simplify determination of the antenna pattern. For example, selecting the group of antenna patterns may facilitate a faster search for the antenna pattern in the group of antenna patterns.

As described further below with reference to FIGS. 4 and 5, the antenna pattern may be omnidirectional or may have increased directionality relative to an omnidirectional antenna pattern, e.g., a primary lobe of the antenna pattern may be directed so that the transmitted energy to or the received energy from, e.g., electronic device 112-1 is increased, which may increase the communication performance (such as by improving one or more performance metrics). For example, radio 116-1 may determine the antenna pattern based at least in part on the orientation using a stored look-up table with predetermined or predefined values (such as a predetermined characterization of the optimal antenna pattern as a function of the orientation). Thus, access point 110-1 may be able to adjust the antenna pattern if the orientation is incorrect or changed in different types of installation. For example, access point 110-1 may change a primary lobe of the antenna pattern so that it is correctly directed towards electronic device 112-1. In some embodiments, access point 110-1 may modify or adapt the output transmit-power level based at least in part on the installation information and/or the environmental information (such as the orientation).

Note that the determination of the antenna pattern may occur: once (such as when access point 110-1 is powered on), or as needed (such as based on one or more performance metrics or during debugging), or periodically (such as every 5 minutes, 10 minutes, 30 minutes, 60 minutes, daily, etc.), or continuously.

Next, access point 110-1 may communicate (such as via radio 116-1) packets or frames for another electronic device (such as electronic device 112-1) using the determined antenna pattern in the group of antenna patterns.

In some embodiments, the group of antenna patterns is selected from an initial set of antenna patterns. After selecting the group of antenna patterns, access point 110-1 may receive, via radio 116-1, additional antenna patterns for inclusion in the group of antenna patterns, which are associated with another electronic device (such as a controller 120). For example, controller may provide the additional antenna patterns to access point 110-1 via network 114.

Figure 6:
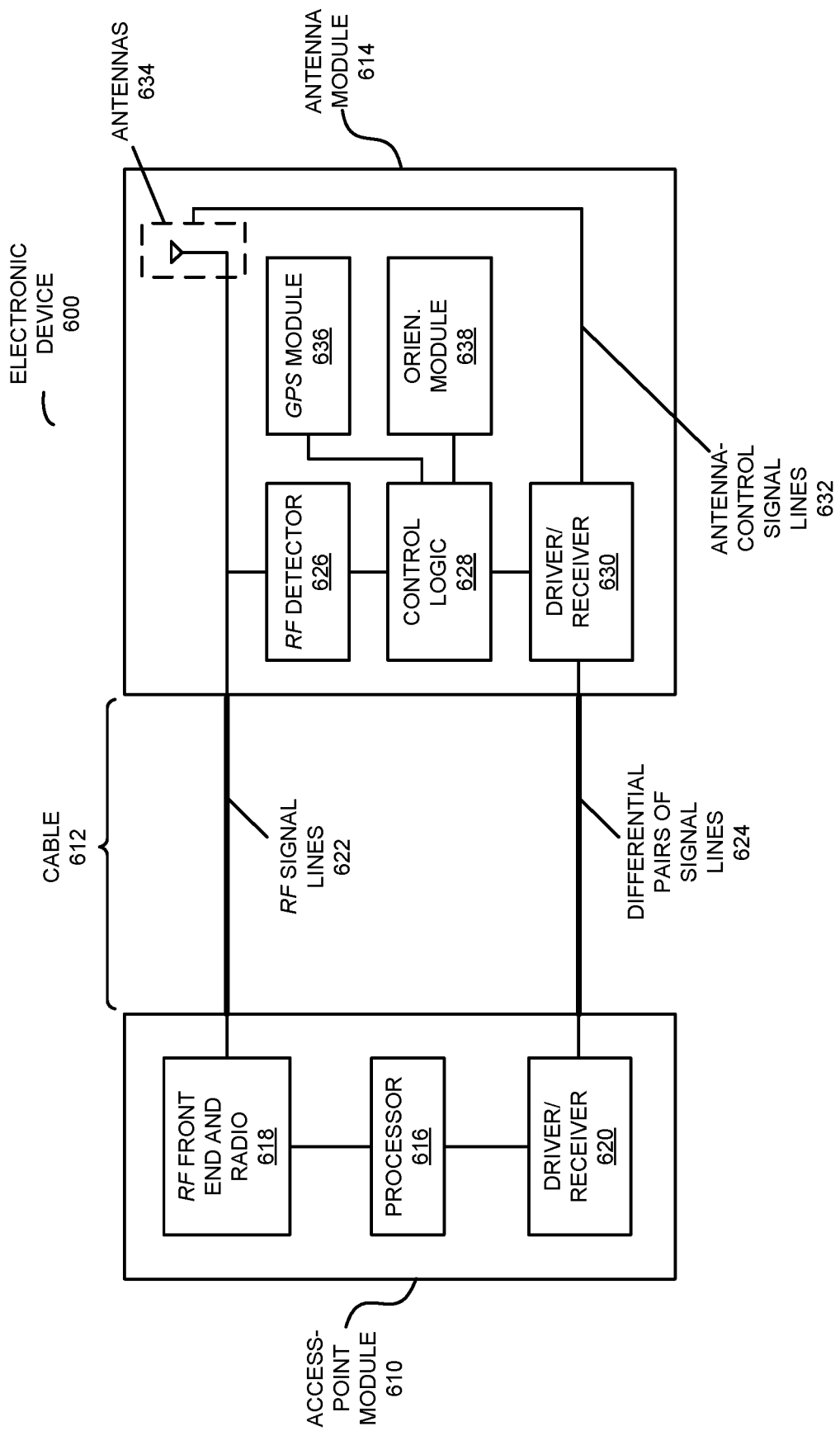
FIG. 6 is a drawing illustrating a distributed system in one of the electronic devices in FIG. 1 in accordance with an embodiment of the present disclosure.

Moreover, as described further below with reference to FIG. 6, the antenna elements may be included in an antenna module, which can be communicatively coupled, via a cable or wirelessly, to one or more antenna nodes in an access point (such as access point 110-2). Thus, in some embodiments, one or more of access points 110 may be distributed. In particular, radios 116 may be physically separated from and connected to antennas module 122 by a cable 124. (Note that a remainder of access point 110-2 is sometimes referred to as an "access-point module.")

In this way, the communication technique may allow access point 110-1 to customize or tailor output transmit-power level and/or the antenna pattern to correct for variations in the types of installation, the location, and/or the orientation. Moreover, the communication technique may reduce the size of memory in access point 110-1 that is used to store information that specifies the group of antenna patterns, which may reduce the cost and complexity of access point 110-1.

Consequently, the communication technique may improve the communication performance of access point 110-1 (such as a reduced variation in one or more performance metrics). Therefore, the communication technique may facilitate an improved user experience when communicating information using access points 110.

Figure 2:
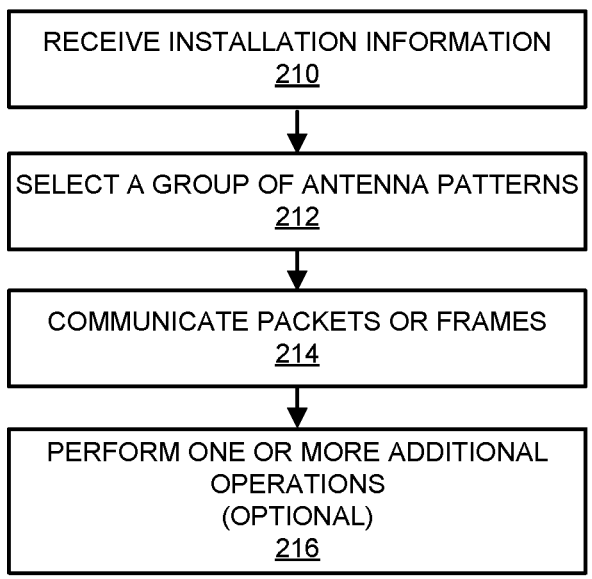
FIG. 2 is a flow diagram illustrating a method for selecting a group of antenna patterns in one of the electronic devices in FIG. 1 in accordance with an embodiment of the present disclosure.

We now describe embodiments of the method. FIG. 2 presents a flow diagram illustrating an example of a method 200 for selecting a group of antenna patterns, which may be performed by an electronic device, e.g., using an interface circuit, such as radio 116-1 in access point 110-1 in FIG. 1. More generally, method 200 may be performed by an electronic device, such as access point 110-1 in FIG. 1.

During operation, the electronic device may receive installation information (operation 210) about an environment of the electronic device. In particular, the installation information may be received via an interface circuit in the electronic device and/or using the user interface in the electronic device. In some embodiments, the installation information may include a type of installation of the electronic device. For example, the type of installation may include one of: installation on a wall, installation on a pole, installation in a stadium, or installation in street furniture.

Based at least in part on the installation information, the electronic device may select the group of antenna patterns (operation 212) that includes a subset of potential antenna patterns. Then, the electronic device may communicate one or more packets or frames (operation 214) for another electronic device using an antenna pattern in the group of antenna patterns.

In some embodiments, the electronic device may perform one or more optional additional operations (operation 216). For example, the electronic device may determine the antenna pattern in the group of antenna patterns to use in the subsequent communication.

Moreover, the electronic device may receive environmental information, and the electronic device may select the group of antenna patterns based at least in part in the environmental information. For example, the environmental information may include an orientation of the electronic device and/or a location of the electronic device. In some embodiments, receiving the environmental information may involve determining the environmental information. In particular, the electronic device may determine a location in two dimensions (such as whether the electronic device is located at a corner in a room) and/or a height of the electronic device. Furthermore, the orientation of the electronic device may be determined using one or more of: an accelerometer, a gyroscope, and/or a magnetometer. Alternatively or additionally, the environmental information may be received via the interface circuit and/or using the user interface in the electronic device.

In some embodiments, the group of antenna patterns is selected from an initial set of antenna patterns. After selecting the group of antenna patterns, the electronic device may receive, at the interface circuit, additional antenna patterns for inclusion in the group of antenna patterns, which are associated with another electronic device (such as a controller).

In some embodiments of method 200, there may be additional or fewer operations. Furthermore, the order of the operations may be changed, and/or two or more operations may be combined into a single operation.

Figure 3:
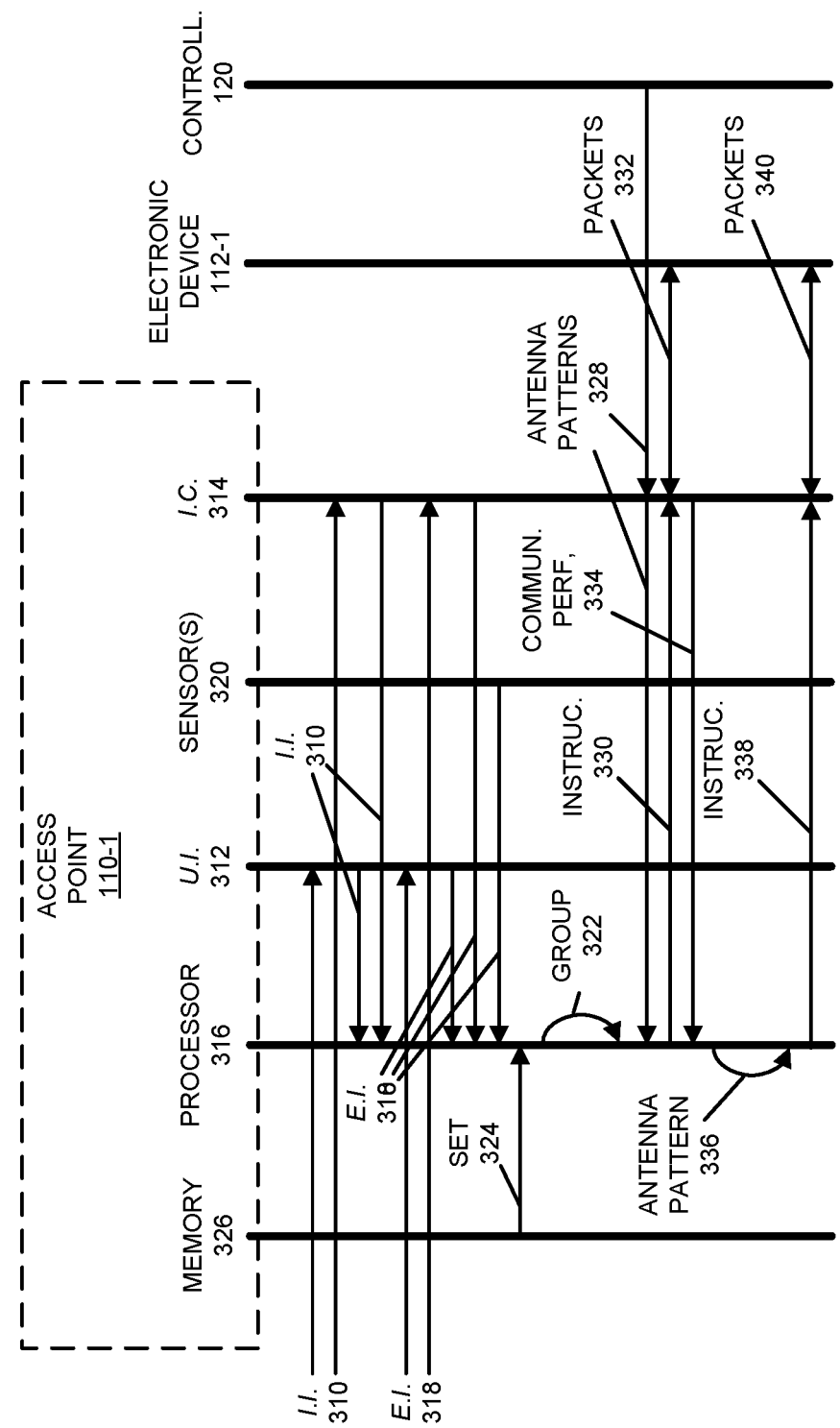
FIG. 3 is a drawing illustrating communication among the electronic devices in FIG. 1 in accordance with an embodiment of the present disclosure.

Embodiments of the communication technique are further illustrated in FIG. 3, which presents a drawing illustrating an example of communication among access point 110-1, electronic device 112-1 and controller 120. In particular, access point 110-1 may receive installation information (I.I.) 310 about an environment of access point 110-1, such as a type of installation of access point 110-1. For example, installation information 310 may be received from an installer of access point 110-1 using user interface 312 and/or using interface circuit (I.C.) 314, such as from an electronic device (not shown) that is associated with the installer or an organization of the installer. After installation information 310 is received, it may be provided to processor 316 in access point 110-1.

Moreover, access point 110-1 may receive environmental information (E.I.) 318. For example, environmental information 318 may include an orientation of access point 110-1 and/or a location of access point 110-1. In some embodiments, environmental information 318 is received from an installer of access point 110-1 using user interface 312 and/or using interface circuit 314, such as from the electronic device (not shown) that is associated with the installer or the organization of the installer. Alternatively or additionally, access point 110-1 may determine environmental information 118, such as using one or more sensors 320 (e.g., an orientation sensor and/or a location sensor, such as: an accelerometer, a gyroscope, a magnetometer, a GPS sensor, etc. After environmental information 318 is received, it may be provided to processor 316.

Based at least in part on installation information 310 and/or environmental information 318, processor 316 may select a group 322 of antenna patterns that includes a subset of potential antenna patterns. In some embodiments, the group of antenna patterns is selected from an initial set 324 of antenna patterns in memory 326 in access point 110-1. After selecting the group of antenna patterns, interface circuit 314 may receive from controller 120 additional antenna patterns 328 for inclusion in the group 322 of antenna patterns. These additional antenna patterns may fill in a sparse subset of the potential antenna patterns, so access point 110-1 is better able to optimize the communication performance by selecting one of the group 322 of antenna patterns. In particular, processor 316 may instruct 330 interface circuit 314 to communicate packets 332 or frames with electronic device 112-1 using the antenna patterns in the group 322 of antenna patterns. Then, based on corresponding communication performance 334, interface circuit 314 and/or processor 316 may determine an antenna pattern 336 in the group 322 of antenna patterns.

Next, processor 316 may instruct 338 interface circuit 314 to communicate packets 340 or frames with electronic device 112-1 using antenna pattern 336. This communication may be unidirectional or bidirectional.

Figure 4:
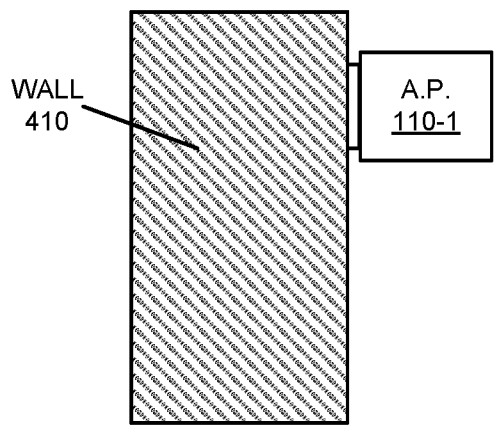
FIG. 4 is a drawing illustrating types of installation of one of the electronic devices in FIG. 1 in accordance with an embodiment of the present disclosure.
Figure 4:
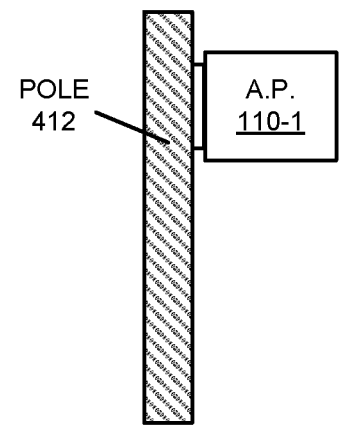
Figure 4:
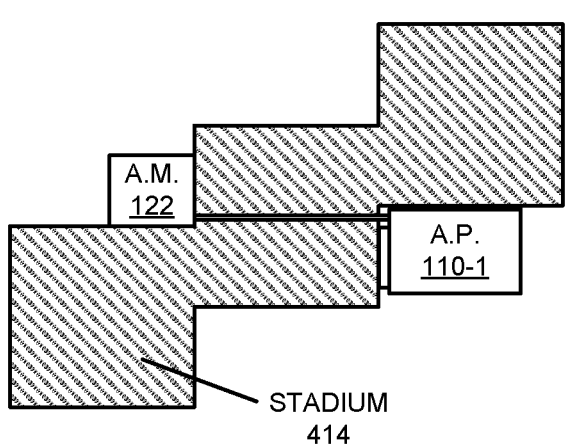
Figure 4:
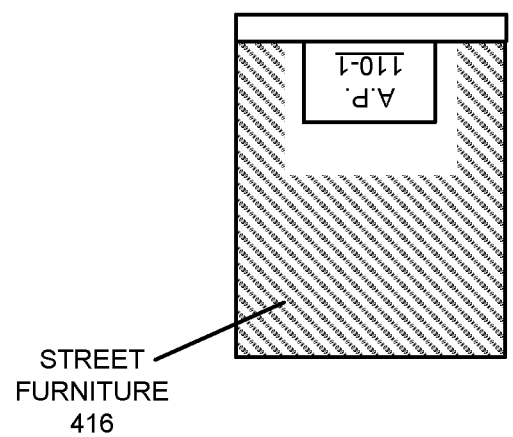

FIG. 4 presents a drawing illustrating examples of types of installation 400 of one of access points 110 in FIG. 1. In particular, in type of installation 400-1, access point 110-1 is installed on a wall 410 (such as a concrete wall) near the ceiling. In this case, the group of antenna patterns may include beams that are directed downward towards the floor (instead of omnidirectional antenna patterns). Moreover, in type of installation 400-2, access point 110-1 is installed on a pole 412, such as a metal pole having a small or a large diameter. Once again, the group of antenna patterns may include beams that are directed downward towards the floor (instead of omnidirectional antenna patterns).

Furthermore, in type of installation 400-3, access point 110-1 is installed in a stadium 414, such as on the opposite side of a concrete pillar. Access point 110-1 may be coupled by a cable to antenna module 122, which is underneath a seat. In this case, the group of antenna patterns may include beams that are directed upwards to where a user is sitting in stadium 414.

Additionally, in type of installation 400-4, access point 110-1 is installed upside down in street furniture 416, such as a concrete planter, a cabinet or on top of a structure. In this case, the group of antenna patterns may include beams that are directed in a lateral direction (such as a dipole antenna pattern) or upwards towards the ground.

Note that the group of antenna patterns may be refined based at least in part on a location and/or an orientation of access point 110-1. For example, as noted above, the height and/or the orientation of the access point in a type of installation may allow the group of antenna patterns to be selected, e.g., by narrowing down the potential antenna patterns. In some embodiments, this may also involve the use of predefined knowledge about a geometry of a particular environment. In particular, if the location is known in two dimensions, the known or predefined knowledge of the geometry of the environment may be used to determine that access point 110-1 is located near a corner, and the potential antenna patterns may be accordingly reduced or pruned.

In these ways, the installation information and/or the environmental information may be used to narrow down the potential antenna patterns, so that the group of antenna patterns can be selected. In particular, the communication technique may allow an access-point design to be adapted to the specific environment of a customer's installation, such as coverage shadows, occlusions, and other non-free-space transmit/receive situations. The communication technique may allow a customer to select one of several preconfigured or predefined groups of antenna patterns depending on their particular installation (i.e., the type of installation). This capability may allow a single antenna design to be used while allowing for multiple installation configurations specific to the customer needs, without having to create a custom antenna pattern and/or antenna for the unique installation.

In some embodiments, the group of antenna patterns includes 256 antenna patterns out of some 4,000 potential antenna patterns. By selecting the group of antenna patterns, the size of the antenna-pattern space may be significantly reduced. Subsequently, a controller may provide additional antenna patterns for inclusion in the group of antenna patterns, which may allow the optimization of the antenna pattern (and, thus, the communication performance of access point 110-1) to be refined. Note that different access points in the same installation may be configured differently.

In some embodiments, the types of installation may include: mounting to a small diameter (relative to the size of the antenna elements or the access point) round metal pole, mounting to a larger diameter round metal pole, mounting on a concrete wall, mounting on three walls in a corner, mounting on stepped concrete in a stadium, etc. Note that the group of antenna pattern may be selected from one or more predefined groups of antenna patterns, which may be pushed to and/or stored at access point 110-1 by controller 120.

Figure 5:
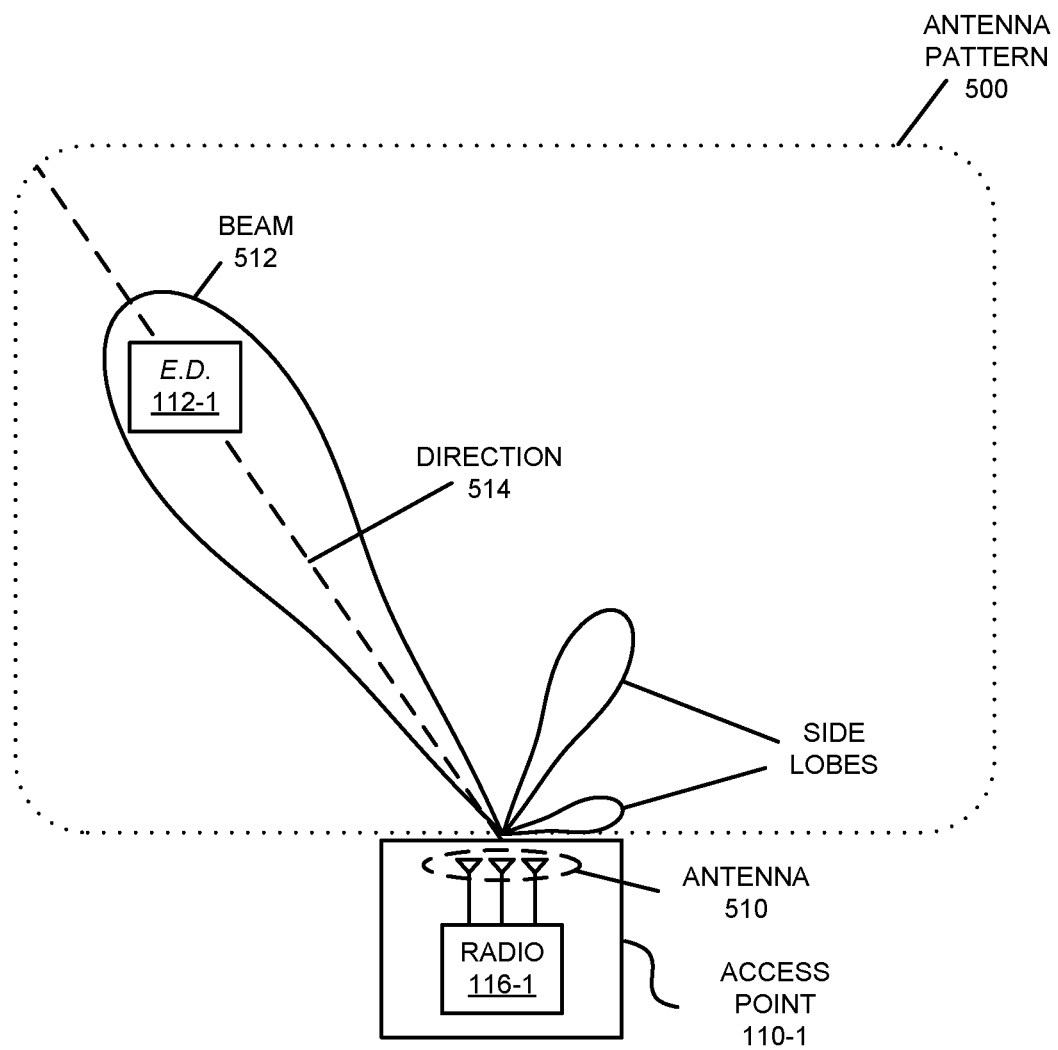
FIG. 5 is a drawing illustrating an antenna pattern of an antenna in one of the electronic devices in FIG. 1 in accordance with an embodiment of the present disclosure.

FIG. 5 presents a drawing illustrating an antenna pattern of an antenna in access point 110-1. In particular, access point 110-1 may configure antenna elements in antenna 510 to select a direction 514 of a primary beam 512 in antenna pattern 500. This selective directionality may improve the sensitivity when access point 110-1 transmits or receives a frame or a packet.

For example, an interface circuit in radio 116-1 may provide control signals or settings that adapt or change antenna pattern 500 of antenna 510. In particular, the control signals or settings may independently and selectively electrically couple pattern shapers or antenna elements (such as reflectors) in antenna 510 to ground in order to steer antenna pattern 500 in different directions (such as direction 514). Thus, if one or more antennas elements in antenna 510 include N antenna pattern shapers, antenna 510 may have $2^N$ different antenna pattern configurations. More generally, a given antenna pattern may include amplitudes and/or phases of signals that specify a direction of the main or primary lobe or beam 512 of the given antenna pattern, as well as so-called "exclusion regions" or "exclusion zones" (which are sometimes referred to as "notches" or "nulls"). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam 512) that directs gain in direction 514 of, e.g., electronic device (E.D.) 112-1 that is of interest and/or one or more local minima that reduce gain in the direction of other electronic devices that are not of interest. More generally, antenna pattern 500 may have N beams at locations of electronic devices (such as electronic device 112-1) that will transmit to or that will receive from access point 110-1 in the subsequent time interval and/or M exclusion zones at the locations of electronic devices that will not transmit to or receive from access point 110-1 in the subsequent time interval, where N and M are integers. For example, antenna 510 may include M+1 antenna elements and there may be M exclusion zones. In this way, the given antenna pattern may be selected so that communication that is undesirable (such as with the other electronic devices) is avoided to reduce or eliminate adverse effects (such as interference or crosstalk) and to increase the sensitivity of transmissions to or from electronic device 112-1.

In some embodiments, if antenna 510 is pointed or oriented in an incorrect manner, antenna pattern 500 is modified so that direction 514 in antenna pattern 500 is correct, such as in a horizontal direction or in a direction of electronic device 112-1.

Alternatively or additionally, antenna pattern 500 may be modified based at least in part on a type of installation, a location, and/or an orientation of access point 110-1 so that beam 512 is pointed in a correct direction. For example, antenna pattern 500 may be modified to correct for the effects of reflections and dielectric material in a wall or a stadium. Moreover, antenna pattern 500 may be modified so that beam 512 points down when access point 110-1 is located near the ceiling or on a pole.

In some embodiments, the access point is distributed. This is shown in FIG. 6, which presents a drawing illustrating an example of a distributed system in an electronic device 600. In particular, electronic device 600 may include: access-point module 610, cable 612 and antenna module 614. Moreover, access-point module 610 may include: a processor 616, radio-frequency (RF) front end and radio 618, and a driver/receiver 620. Furthermore, cable 612 may include RF signal lines 622 and differential pairs of signal lines 624 for differential signals. For example, cable 612 may include an RJ50 cable and associated connectors. Additionally, antenna module 612 may include: an RF detector 626, control logic 628 (such as a programmable logic device with an analog-to-digital converter or ADC), a driver/receiver 630, antenna-control signal lines 632, one or more antennas 634, an optional GPS module 636 and an optional orientation module 638.

During a normal operating mode, RF front end and radio 618 may provide, on RF signal lines 622, electrical signals corresponding to a frame or packet that is to be transmitted by the one or more of antennas 634. Moreover, driver/receiver 620 may provide, on differential pairs of signal lines 624, differential signals that specify an antenna pattern (such as a transmit antenna pattern and/or a receive antenna pattern) of the one or more of antennas 634. For example, driver/receiver 620 may convert single-ended antenna digital control signals from processor 616 into the differential signals (note that the use of differential signaling may facilitate high speeds while being cost effective). After receiving the differential signals, driver/receiver 630, may convert the differential signals into the single-ended digital control signals and may set the antenna pattern of the one or more antennas 634 via antenna-control signal lines 632.

Then, in a feedback operating mode, RF detector 626 (such as a Schottky diode) and control logic 628 may measure the input transmit-power level of the electronic signals on RF signal lines 622 at inputs to antenna module 612. Next, driver/receiver 630 may convert the measured input transmit-power level into differential feedback signals and may provide, via differential pairs of signal lines 624, these feedback signals about the measured input transmit-power level to driver/receiver 620. After receiving the differential feedback signals, driver/receiver 620 may convert the differential feedback signals into single-ended feedback. This single-ended feedback may be used by processor 616 to modify the output transmit-power level. Moreover, based on the modified output transmit-power level, RF front end and radio 618 may modify the output transmit-power level specified by the electrical signals, such as by changing the gain of a power amplifier, thereby obtaining the correct transmit power at the one or more antennas 634. For example, the output transmit-power level from RF front end and radio 618 may be set to the maximum output transmit-power level (such as 20 or 22 dBm) based on the longest length of cable 612 (such as 3 meters). Then, based on the feedback (which, via the measurements at antenna module 614), may specify the actual cable length), the output transmit-power level may be reduced.

In some embodiments, optional GPS module 636 determines a location of electronic device 600 and/or optional orientation module 638 determines an orientation of the one or more antennas 634. For example, via differential pairs of signal lines 624, processor 616 may send instructions to optional GPS module 636 to determine the location. Moreover, the information specifying the determined location and/or the determined orientation may be included in the feedback. Based on this information, processor 616 may modify the output transmit-power level specified by the electrical signals and/or the antenna pattern specified by the antenna digital control signals during the normal operation mode may be changed.

Note that in the feedback operating mode, the one or more antennas 634 may be set to an omnidirectional antenna pattern when the differential pairs of signal lines 624 are conveying the digital feedback signals so that a connection with a client (such as electronic device 112-1 in FIG. 1) is not lost during this period. Moreover, there may not be a degradation in the overall communication performance during the period because the feedback data transfer may be small (i.e., short) and infrequent.

We now describe embodiments of an electronic device, which may perform at least some of the operations in the communication technique. FIG. 7 presents a block diagram illustrating an electronic device 700 in accordance with some embodiments, such as one of access points 110 or electronic devices 112. This electronic device includes processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, one or more graphics processing units, and/or one or more digital signal processors (DSPs).

Memory subsystem 712 includes one or more devices for storing data and/or instructions for processing subsystem 710 and networking subsystem 714. For example, memory subsystem 712 can include dynamic random-access memory (DRAM), static random-access memory (SRAM), and/or other types of memory. In some embodiments, instructions for processing subsystem 710 in memory subsystem 712 include: one or more program modules or sets of instructions (such as program module 722 or operating system 724), which may be executed by processing subsystem 710. Note that the one or more computer programs or program modules may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718, an optional cable 706, and one or more antennas 720 (or antenna elements), which may be included in an optional antenna module 730. (While FIG. 7 includes antenna module 730, in some embodiments electronic device 700 includes one or more nodes, such as nodes 708, e.g., a pad, which can be coupled to antenna module 730. Thus, electronic device 700 may or may not include antenna modules 730. Note that the one or more nodes 708 may constitute input(s) to and/or output(s) from electronic device 700.) For example, networking subsystem 714 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 700 may be adapted or changed using pattern shapers (such as reflectors) in one or more antennas 720 (or antenna elements), which can be independently and selectively electrically coupled to ground to steer the transmit antenna pattern in different directions. Thus, if one or more antennas 720 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called "exclusion regions" or "exclusion zones" (which are sometimes referred to as "notches" or "nulls"). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 700 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a "network interface" for the network system. Moreover, in some embodiments a "network" or a "connection" between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices as described previously.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, a controller, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program module 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a "communication circuit") may implement some or all of the functionality of networking subsystem 714. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that "monitoring" as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used an Ethernet and a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 722, operating system 724 (such as a driver for interface circuit 718) or in firmware in interface circuit 718. Note that the communication technique may occur while processing system 710 executes program module 722. Thus, the communication technique may be implemented at runtime of program module 722. Alternatively or additionally, at least some of the operations in the communication technique may be implemented in a physical layer, such as hardware in interface circuit 718.

Moreover, while the preceding discussion illustrated embodiments of the communication technique in which an access point transmits to or receives a frame or a packet from an electronic device, in some embodiments the access point may concurrently transmit to or receive frames or packets from two or more electronic devices. For example, the communication protocol in a WLAN may use orthogonal frequency division multiple access (OFDMA).

In the preceding description, we refer to "some embodiments." Note that "some embodiments" describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   one or more antenna nodes configured to couple to antenna elements; and
   an interface circuit communicatively coupled to the one or more antenna nodes, wherein the electronic device is configured to:
      receive installation information of the electronic device in an environment of the electronic device, wherein the installation information specifies a type of material of an object that the electronic device is installed on and that is adjacent to the electronic device, and wherein the object is stationary;
      select, based at least in part on the installation information including the type of material, a group of antenna patterns that comprises a subset of potential antenna patterns, wherein the selection provides a correction for effects of reflections from the object and dielectric material in the type of material of the object on one or more of the potential antenna patterns, and wherein the group of antenna patterns is selected from an initial set of antenna patterns; and
      after selecting the group of antenna patterns, receive, at the interface circuit, additional antenna patterns for inclusion in the group of antenna patterns, which are associated with a second electronic device; and
      communicate, via the interface circuit, one or more packets or frames for another electronic device using an antenna pattern in the group of antenna patterns.

2. The electronic device of claim 1, wherein the electronic device is configured to determine the antenna pattern in the group of antenna patterns to use in the subsequent communication.

3. The electronic device of claim 1, wherein the installation information comprises a type of installation of the electronic device.

4. The electronic device of claim 3, wherein the type of installation comprises one of: installation on a wall, installation on a pole, installation in a stadium, or installation in street furniture.

5. The electronic device of claim 1, wherein the electronic device receives environmental information; and
   wherein the electronic device is configured to select the group of antenna patterns based at least in part in the environmental information.

6. The electronic device of claim 5, wherein the environmental information comprises at least one of: an orientation of the electronic device or a location of the electronic device.

7. The electronic device of claim 5, wherein receiving the environmental information involves determining the environmental information.

8. The electronic device of claim 7, wherein the location comprises one of: the location in two dimensions or a height of the electronic device.

9. The electronic device of claim 1, wherein the electronic device comprises an access point.

10. A non-transitory computer-readable storage medium for use in conjunction with an electronic device, the computer-readable storage medium storing a program module that, when executed by the electronic device, selects a group of antenna patterns by causing the electronic device to perform one or more operations comprising:
   receiving installation information of the electronic device in an environment of the electronic device, wherein the installation information specifies a type of material of an object that the electronic device is installed on and that is adjacent to the electronic device, and wherein the object is stationary;

selecting, based at least in part on the installation information including the type of material, a group of antenna patterns that comprises a subset of potential antenna patterns, wherein the selection provides a correction for effects of reflections from the object and dielectric material in the type of material of the object on one or more of the potential antenna patterns, and wherein the group of antenna patterns is selected from an initial set of antenna patterns;

after selecting the group of antenna patterns, receiving additional antenna patterns for inclusion in the group of antenna patterns, which are associated with a second electronic device; and communicating, via an interface circuit in the electronic device, one or more packets or frames for another electronic device using an antenna pattern in the group of antenna patterns.

11. The computer-readable storage medium of claim 10, wherein the one or more operations comprise determining the antenna pattern in the group of antenna patterns to use in the subsequent communication.

12. The computer-readable storage medium of claim 10, wherein the installation information comprises a type of installation of the electronic device; and wherein the type of installation comprises one of: installation on a wall, installation on a pole, installation in a stadium, or installation in street furniture.

13. The computer-readable storage medium of claim 10, wherein the one or more operations comprise receiving environmental information; and wherein the group of antenna patterns is selected based at least in part in the environmental information.

14. The computer-readable storage medium of claim 13, wherein the environmental information comprises at least one of: an orientation of the electronic device or a location of the electronic device.

15. The computer-readable storage medium of claim 14, wherein the location comprises one of: the location in two dimensions or a height of the electronic device.

16. A method for selecting a group of antenna patterns, comprising:

by an electronic device:

receiving installation information of the electronic device in an environment of the electronic device, wherein the installation information specifies a type of material of an object that the electronic device is installed on and that is adjacent to the electronic device, and wherein the object is stationary;

selecting, based at least in part on the installation information including the type of material, the group of antenna patterns that comprises a subset of potential antenna patterns, wherein the selection provides a correction for effects of reflections from the object and dielectric material in the type of material of the object on one or more of the potential antenna patterns, and wherein the group of antenna patterns is selected from an initial set of antenna patterns;

after selecting the group of antenna patterns, receiving additional antenna patterns for inclusion in the group of antenna patterns, which are associated with a second electronic device; and communicating, via an interface circuit in the electronic device, one or more packets or frames for another electronic device using an antenna pattern in the group of antenna patterns.

17. The method of claim 16, wherein the installation information comprises a type of installation of the electronic device; and wherein the type of installation comprises one of: installation on a wall, installation on a pole, installation in a stadium, or installation in street furniture.

18. The method of claim 16, wherein the method comprises receiving environmental information; and wherein the group of antenna patterns is selected based at least in part in the environmental information.

19. The method of claim 18, wherein the environmental information comprises at least one of: an orientation of the electronic device or a location of the electronic device.

* * * * *